(12) United States Patent
Ferber et al.

(10) Patent No.: US 8,139,440 B2
(45) Date of Patent: Mar. 20, 2012

(54) SPECTRAL CONDITIONING FOR SURFACE SEISMIC DATA

(75) Inventors: Ralf Ferber, West Sussex (GB); Debra Dishberger, Houston, TX (US); Alan Teague, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 1117 days.

(21) Appl. No.: 11/964,925

(22) Filed: Dec. 27, 2007

(65) Prior Publication Data

US 2009/0168601 A1 Jul. 2, 2009

(51) Int. Cl.
*G01V 1/36* (2006.01)

(52) U.S. Cl. ............... 367/38; 367/43; 367/50; 367/47; 367/21; 702/17

(58) Field of Classification Search ............ 367/21, 367/24, 32, 43, 46, 47, 49, 54, 68, 73; 702/14, 702/17
See application file for complete search history.

(56) References Cited

U.S. PATENT DOCUMENTS

| | | | | |
|---|---|---|---|---|
| 4,752,916 | A * | 6/1988 | Loewenthal | 367/24 |
| 5,173,879 | A * | 12/1992 | Cung et al. | 367/46 |
| 5,479,376 | A * | 12/1995 | Gonzalez et al. | 367/47 |
| 5,491,669 | A * | 2/1996 | Chambers | 367/49 |
| 5,555,218 | A * | 9/1996 | Chambers et al. | 367/73 |
| 5,629,905 | A * | 5/1997 | Lau | 367/54 |
| 6,889,142 | B2 * | 5/2005 | Schonewille | 702/17 |
| 2006/0265132 | A1 * | 11/2006 | Rickett | 702/14 |

FOREIGN PATENT DOCUMENTS

| | | |
|---|---|---|
| WO | 2006025823 A | 3/2006 |
| WO | 2006025824 A | 3/2006 |

OTHER PUBLICATIONS

Kirchheimer, et al., Robust Surface Consistent Deconvolution with Noise Suppression, Expanded Abstracts, EAGE 2002.
Cambois, et al., Surface-Consistent Deconvolution in the Log/Fourier Domain, Geophysics, 1992, pp. 823-840, vol. 57.
Futterman, Dispersive Body Waves, Journal of Geophysical Research, 1962, pp. 5279-5291, vol. 67.
Hale, Q-Adaptive Deconvolution, Sep. 30, 1982, pp. 133-158.
Hargreaves, et al., Inverse Q filtering by Fourier Transform, 1991, Geophysics, pp. 519-527, vol. 56.
Valera, et al., Modeling of Attenuation and Dispersion, 1993, Geophysics, pp. 1167-1173, vol. 58.
Robinson, A Technique for Continuous Representation of Dispersion on Seismic Data, Geophysics, pp. 1245-1351, vol. 44 , 1979.

* cited by examiner

*Primary Examiner* — Jack Keith
*Assistant Examiner* — Daniel L Murphy (57) ABSTRACT

A method for spectrally conditioning surface seismic data. In one implementation, the method may include correcting surface seismic data for distortions due to anomalous spectral amplitudes, thereby generating a first set of corrected data; correcting the first set of corrected data for deterministic distortions, thereby generating a second set of corrected data; correcting the second set of corrected data for spectral distortions due to the seismic waves traveling through the near-surface, thereby generating a third set of corrected data; and correcting the third set of corrected data for spectral distortions due to the seismic waves traveling through deeper strata.

21 Claims, 7 Drawing Sheets

SPECTRAL CONDITIONING FOR SURFACE SEISMIC DATA

BACKGROUND

1. Field of the Invention

Implementations of various techniques described herein generally relate to correcting seismograms for various distortions.

2. Description of the Related Art

The following descriptions and examples do not constitute an admission as prior art by virtue of their inclusion within this section.

In a typical seismic survey, a plurality of seismic sources, such as explosives, vibrators, airguns or the like, may be sequentially activated at or near the surface of the earth to generate energy which may propagate into and through the earth. The seismic waves may be reflected back by geological formations within the earth. The resultant seismic wavefield may be sampled by a plurality of seismic sensors, such as geophones, hydrophones and the like, that may be various distances or offsets from the source. Each sensor may be configured to acquire seismic data at the sensor's location, normally in the form of a seismogram representing the value of some characteristic of the seismic wavefield against time. A seismogram may also be commonly known as a seismic trace. The acquired seismograms may be transmitted wirelessly or over electrical or optical cables to a recorder system. The recorder system may then store, analyze, and/or transmit the seismograms. The seismograms recorded as a result of an activation of a source may be referred to as a shot record or a gather. A plurality of gathers may result from a seismic survey. The seismic data may be used to detect the possible presence of hydrocarbons, changes in the subsurface and the like.

Each seismogram may contain distortions as well as refracted waves. Various techniques have been developed to remove distortions from seismograms. Equipment used in a seismic survey, such as components of the data acquisition system or of the source generation system, may introduce distortions into the seismic data. The seismic data may be corrected to compensate for known, or deterministic, distortions. Such distortions may, for example, be introduced by the actual sensors used to record seismic data. Because the amplitude and phase transfer functions of such systems are known, inverse filters may be constructed to compensate for these distortions.

Surface consistent deconvolution is a well-known technique for processing seismograms to correct for distortions. Surface consistent deconvolution may consist of several steps including the collection of individual amplitude spectra from acquired seismograms, recombination of seismogram spectra from surface consistent spectra for each individual seismogram, computation of inverse filters to whiten the recombined spectra and application of the inverse filters for deconvolution purposes. Surface consistent deconvolution may use information gathered through surface consistent spectral analysis. Surface consistent spectral analysis may be defined as a surface consistent redistribution of amplitude spectra of individual seismograms onto at least global, source, receiver, offset, and common-midpoint terms.

As seismic waves travel through the earth, distortions may occur as some of the energy of the seismic waves is lost due to absorption or dissipative effects, i.e., the energy may be dissipated into heat. A common technique used to correct seismograms to compensate for the absorption effects is absorption compensation filtering, also known as inverse Q-filtering, in which the absorption may first be estimated followed directly by a deconvolution filter to compensate for the found absorption. However, this technique does neither estimate the absorption in a surface consistent way, nor does it preserve the surface consistent wavelet model of the data. Therefore, single trace absorption compensation may not be combined in a meaningful way with processing steps such as surface consistent deconvolution.

SUMMARY

Described herein are implementations of various techniques for a method for optimizing spectral conditioning of surface seismic data. In one implementation, the method may include correcting surface seismic data for distortions due to anomalous spectral amplitudes, thereby generating a first set of corrected data; correcting the first set of corrected data for deterministic distortions, thereby generating a second set of corrected data; correcting the second set of corrected data for spectral distortions due to the seismic waves traveling through the near-surface, thereby generating a third set of corrected data; and correcting the third set of corrected data for spectral distortions due to the seismic waves traveling through deeper strata.

Described herein are implementations of various techniques for a method for correcting distortions due to anomalous spectral amplitudes from surface seismic data. In one implementation, the method may include performing a surface consistent spectral analysis using surface seismic data to generate a set of amplitude spectra, computing an actual amplitude spectra of each seismogram in the surface seismic data, computing an estimated amplitude spectra of each seismogram using the set of amplitude spectra, comparing the actual amplitude spectra with the estimated amplitude spectra of each seismogram to determine portions of each seismogram dominated by anomalies, removing the portions of each seismogram dominated by the anomalies, reconstructing the removed portions of each seismogram.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs generally describe one or more implementations of various techniques directed to methods for optimizing spectral conditioning of surface seismic data. In one implementation, surface seismic data may be processed to correct for one or more of four types of distortions. The data may be corrected for anomalous spectral amplitudes, deterministic distortions, spectral distortions due to the seismic waves traveling through the near-surface and spectral distortions due to the seismic waves traveling through deeper strata. Spectral distortions may be defined herein as amplitude and phase distortions of the acquired surface seismic data that may vary with temporal frequencies. Surface consistent anomalous spectral amplitude attenuation may be performed to correct for distortions in the surface seismic data due to spectral anomalies, i.e. amplitude spikes or glitches in the data, for example due to spurious outliers or seismic waves that are surface inconsistent in nature such as ground roll in land environments and swell noise in marine environments. One benefit of optimizing spectral conditioning of surface seismic data may be to obtain the offset dependent seismic reflectivity with substantially no spectral amplitude and phase distortions, without requiring the use of well log data. The spectral conditioned surface seismic data may be used to determine wave velocities and other reservoir parameters to control reservoir production.

Figure 1:
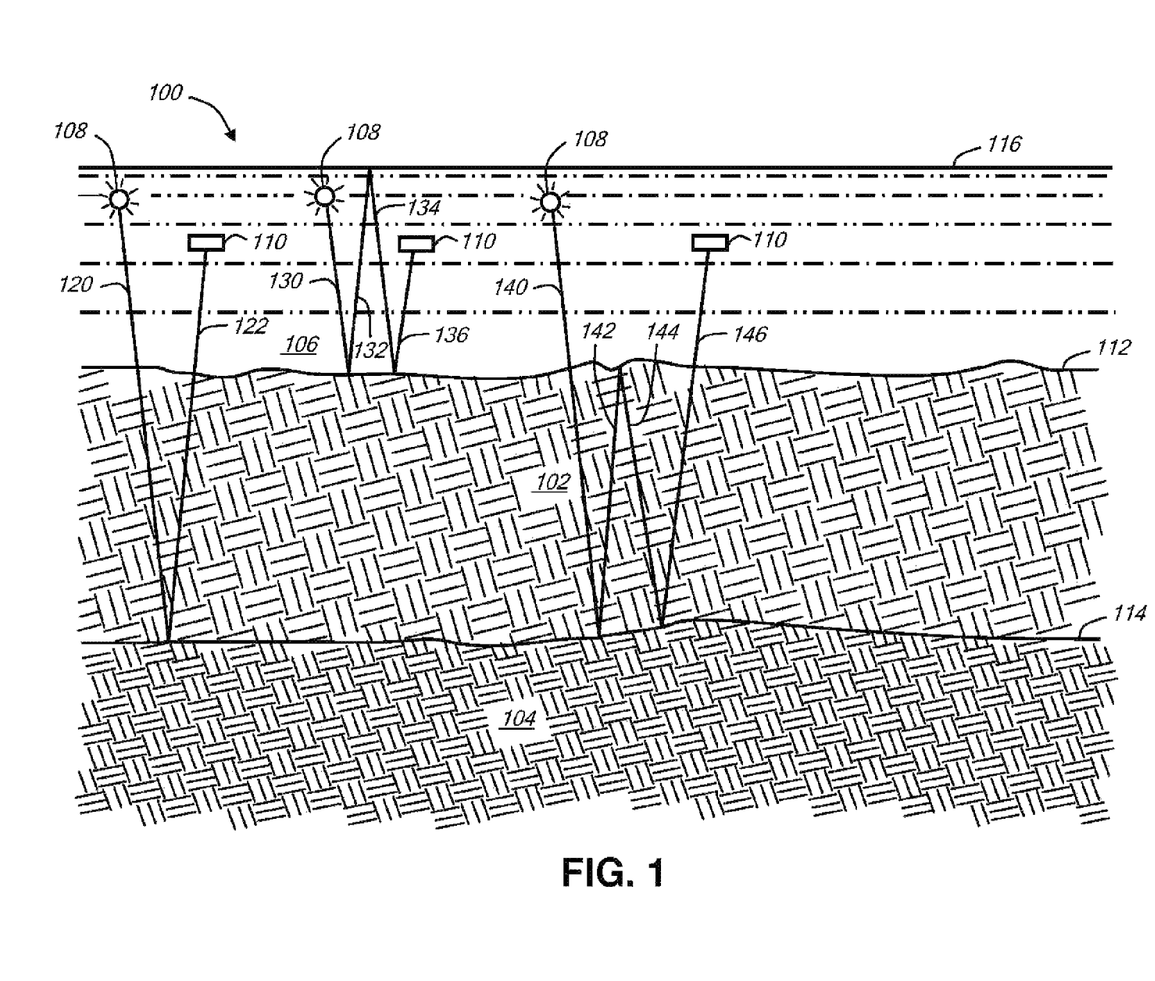
FIG. 1 illustrates a schematic view of marine seismic surveying in connection with implementations of various techniques described herein.

FIG. 1 illustrates a schematic view of marine seismic surveying 100 in connection with implementations of various techniques described herein. Subterranean formations to be explored, such as 102 and 104, lie below a body of water 106. Seismic energy sources 108 and seismic receivers 110 may be positioned in the body of water 106, typically by one or more seismic vessels (not shown). A seismic source 108, such as an air gun and the like, may create seismic waves in the body of water 106. As a result, a portion of the seismic waves may travel downward through the body of water 106 toward the subterranean formations 102 and 104 beneath the body of water 106. When the seismic waves reach a seismic reflector, a portion of the seismic waves may reflect upward and another portion of the seismic waves may continue downward. The seismic reflector may be the water bottom 112 or one of the interfaces between subterranean formation, such as interface 114 between formations 102 and 104. When the reflected waves traveling upward reach the water/air interface at the water surface 116, a majority portion of the waves may reflect downward again. Continuing in this fashion, seismic waves may reflect multiple times between upward reflectors, such as the water bottom 112 or formation interface 114, and the downward reflector at the water surface 116 above. Each time the reflected waves propagate past the position of a seismic receiver 110, the seismic receiver 110 may sense the reflected waves and generate representative seismic signals. These seismic signals may then be used to yield valuable information regarding the geophysical characteristics of the explored subterranean formations. It should be understood that the various techniques described herein may be applied in any seismic survey environment such as marine or land.

Figure 2:
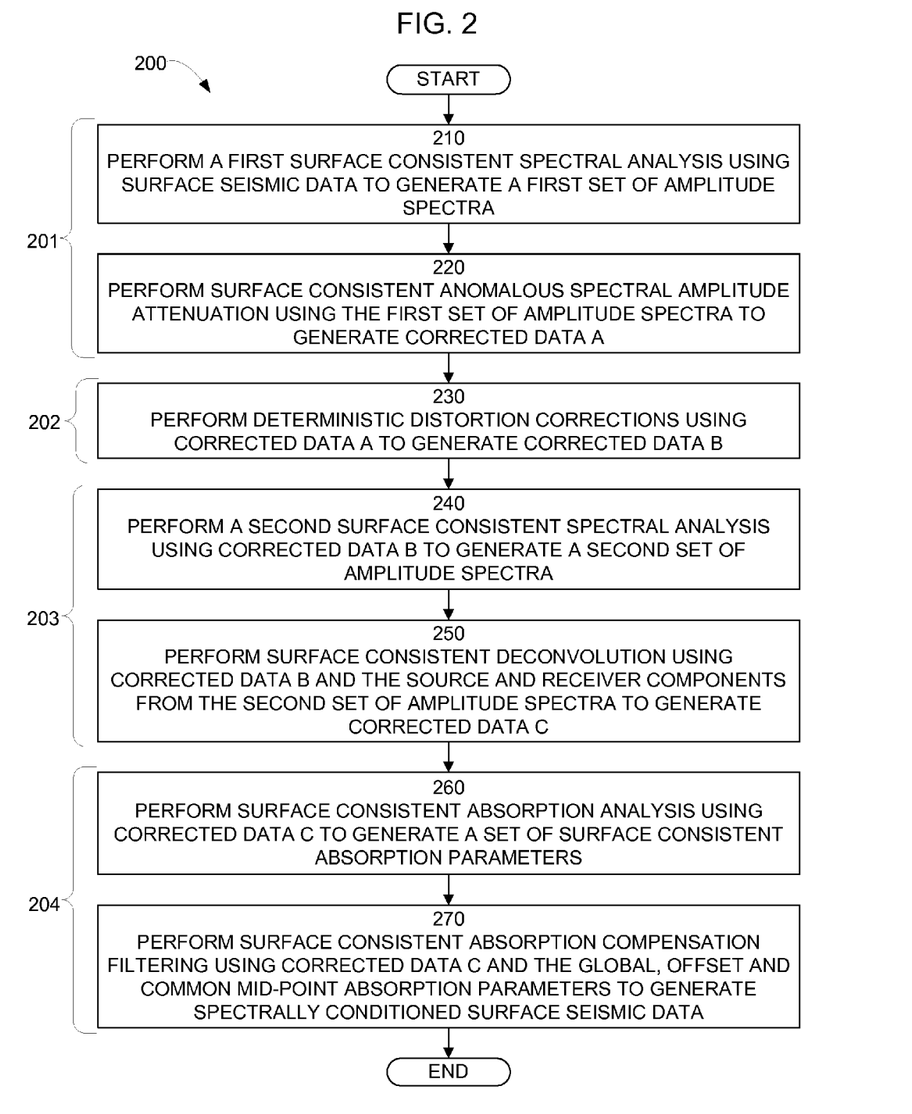
FIG. 2 illustrates a flow diagram of a method for optimizing spectral conditioning of surface seismic data in accordance with implementations of various techniques described herein.

FIG. 2 illustrates a flow diagram of a method 200 for optimizing spectral conditioning of surface seismic data in accordance with implementations of various techniques described herein. However, it should be understood that the operations illustrated in flow diagram are not necessarily limited to being performed by method 200. Additionally, it should be understood that while the operational flow diagram 200 indicates a particular order of execution of the operations, in other implementations, the operations might be executed in a different order. Further, it should be understood that while the operational flow diagram 200 indicates four steps, in some implementations one or more of the steps may be eliminated.

In FIG. 2, the flow diagram of the method 200 for optimizing spectral conditioning of surface seismic data may be segmented by the methods for correcting each type of distortion. A method to correct for distortions due to anomalous spectral amplitudes 201 may be described by steps 210-220. A method to correct for deterministic distortions 202 may be described by step 230. A method to correct for spectral distortions due to the seismic waves traveling through the near-surface 203 may be described by steps 240-250. A method to correct for spectral distortions due to the seismic waves traveling through deeper strata 204 may be described by steps 260-270.

Figure 3:
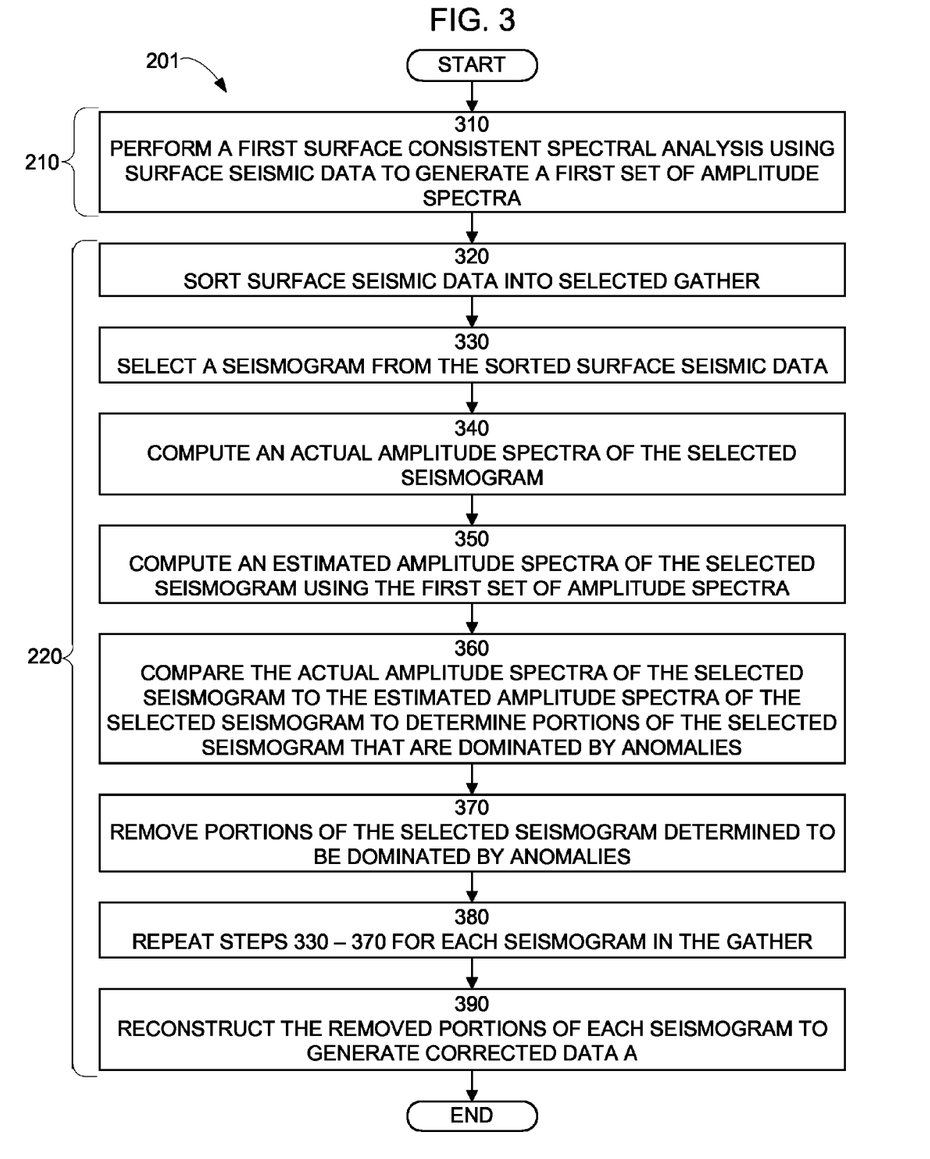
FIG. 3 illustrates a flow diagram of a method for correcting distortions due to anomalous spectral amplitudes from surface seismic data in accordance with implementations of various techniques described herein.

A method to correct for distortions due to anomalous spectral amplitudes 201 may consist of an analysis phase (step 210) and a correction phase (step 220). FIG. 3 illustrates a flow diagram of a method 201 for correcting distortions due to anomalous spectral amplitudes from surface seismic data in accordance with implementations of various techniques described herein. As shown in FIG. 3, step 310 corresponds to steps 210 and describes the surface consistent spectral analysis performed on surface seismic data. Steps 320 to 390 further detail step 220, surface consistent anomalous spectral amplitude attenuation. In general, the method to correct for distortions due to anomalous spectral amplitudes 201 may be described as the detection of spectral anomalies in seismograms (steps 310-380) and the reconstruction of anomalous portions of seismograms (step 390). A method to correct for distortions due to anomalous spectral amplitudes 201 may be used to remove anomalies from surface seismic data such that the anomalies do not degrade the usefulness of the data.

At step 310, a first surface consistent spectral analysis may be performed on surface seismic data to generate a first set of amplitude spectra. Various known surface consistent spectral analysis techniques may be used. Because the surface consistent spectral analysis may be biased due to spectral anomalies, a robust surface consistent spectral modeling technique may be used, such as the technique insensitive to such anomalies presented in "Robust Surface Consistent Deconvolution with Noise Suppression" authored by F. Kirchheimer and R. Ferber, EAGE, 2002. The first set of amplitude spectra may be in a data base containing the spectral components of the surface consistent wavelet model such as a global amplitude component, a source amplitude component, a receiver amplitude component, an offset amplitude component and a common midpoint amplitude component.

At step 320, the surface seismic data may be sorted into a selected gather such as a shot record, common midpoint gather or common-offset gather. The gather used may vary according to implementation. For example, at step 390 when the anomalous portions of seismograms are being reconstructed, the type of gather may determine whether enough anomaly-free data is available for reconstruction since the seismograms may be reconstructed from neighboring seismograms in the gather.

At step 330, a seismogram may be selected from the sorted surface seismic data.

At step 340, an actual amplitude spectra of the selected seismogram, $d(t,f)$, may be computed. The actual amplitude spectra may be computed by performing a time variant Fourier transform of the selected seismogram. The amplitude of the Fourier transform may yield the amplitude spectra of the selected seismogram.

At step 350, an estimated amplitude spectra of the selected seismogram, $\hat{d}(t,f)$, may be computed using the first set of amplitude spectra from step 310. The estimated amplitude spectra may be an estimated Fourier transform spectra that is free of anomalies.

At step 360, the actual amplitude spectra of the selected seismogram, $d(t,f)$, may be compared to the estimated amplitude spectra of the selected seismogram, $\hat{d}(t,f)$, to determine the portions of the seismogram that are dominated by anomalies. If the estimated amplitude spectra of the selected seismogram, $\hat{d}(t,f)$, is produced in a robust fashion such that the influence of the surface in-consistent spectral anomalies may be minimized, the difference, $d(t,f)-\hat{d}(t,f)$, between the actual amplitude spectra of the selected seismogram, $d(t,f)$, and the estimated amplitude spectra of the selected seismogram, $\hat{d}(t,f)$, may allow detection of those portions of the selected seismogram that may be dominated by anomalies. The portions of the selected seismogram may be determined to be dominated by anomalies if the magnitude of the difference is above a certain threshold, $|d(t,f)-\hat{d}(t,f)|>\epsilon$. The threshold may be computed from a statistical analysis of the difference between actual data and surface consistent data estimate.

At step 370, the portions of the selected seismogram determined to be dominated by anomalies may be removed.

At step 380, steps 330-370 may be repeated for each seismogram in the gather.

At step 390, the removed portions of each seismogram may be reconstructed to generate corrected data A. Corrected data A may be surface seismic data with spectral anomalies removed. In this step, the surface seismic data determined to be dominated by anomalies may be reconstructed from the neighboring surface seismic data that was not determined to be dominated by anomalies. This scenario defines de-facto a time and frequency dependent data sampling regime, because only the data that was not determined to be dominated by anomalies is available for reconstruction of data that was determined to be dominated by anomalies. As discussed at step 320, for reconstruction, the data may be sorted into appropriate data gathers, increasing the likelihood that enough data without anomalies is available for reconstruction. For each time and frequency value, the actual sampling regime may therefore be irregular. The removed portions of each seismogram may be reconstructed by various methods such as Fourier reconstruction. If the local sampling regime is not fit for reconstruction, a single channel noise attenuation filter, such as described in "Robust Surface Consistent Deconvolution with Noise Suppression" authored by F. Kirchheimer and R. Ferber, EAGE, 2002, may be used.

Returning to FIG. 2, a method to correct for deterministic distortions 202 may consist of a correction phase (step 230). At step 230, deterministic distortion corrections may be performed using corrected data A to generate corrected data B. Known techniques for performing deterministic distortion corrections may be performed using corrected data A. Corrected data B may be surface seismic data with spectral anomalies and known distortions removed.

A method to correct for spectral distortions due to the seismic waves traveling through the near-surface 203 may consist of an analysis phase (step 240) and a correction phase (step 250). At step 240, a second surface consistent spectral analysis may be performed using corrected data B to generate a second set of amplitude spectra. Various known surface consistent spectral analysis techniques may be used. The second set of amplitude spectra may be in a data base containing the spectral components of the surface consistent wavelet model such as a global amplitude component, a source amplitude component, a receiver amplitude component, an offset amplitude component and a common midpoint amplitude component.

At step 250, surface consistent deconvolution may be performed on corrected data B using only the source and receiver components from the second set of amplitude spectra to generate corrected data C. Corrected data C may be surface seismic data with spectral anomalies, known distortions and near-surface distortions removed. Known techniques for surface consistent deconvolution may be used. However, only the source and receiver components of the second set of amplitude spectra may be used for the computation of the deconvolution filters. As such, the corresponding filter may be interpreted as a near-surface spectral distortion compensation filter.

A method to correct for spectral distortions due to the seismic waves traveling through deeper strata 204 may consist of an analysis phase (step 260) and a correction phase (step 270). At step 260, surface consistent absorption analysis may be performed using corrected data C to generate a set of surface consistent absorption parameters. The set of surface consistent absorption parameters may be a data base containing the estimated time-variant absorption parameters of the surface consistent wavelet model such as a global parameter, a source parameter, a receiver parameter, an offset parameter and a common midpoint parameter.

At step 270, surface consistent absorption compensation filtering may be performed using corrected data C and the global, offset and common-midpoint absorption parameters to generate spectrally conditioned surface seismic data. The spectrally conditioned surface seismic data may be surface seismic data with spectral anomalies, known distortions, near-surface distortions and deeper strata distortions removed.

The method to correct for spectral distortions due to the seismic waves traveling through deeper strata 204 may be surface consistent absorption compensation filtering as introduced in copending U.S. patent application Ser. No. 11/760,629, entitled SEISMOGRAM CORRECTION FOR ABSORPTION EFFECTS, filed on Jun. 8, 2007. In surface consistent absorption compensation filtering, a surface consistent model of absorption similar to that of surface consistent deconvolution may first be estimated. Using this model the ratio of traveltime and absorption parameter Q may follow an additive linear equation in the component ratios of these quantities. This set of equations may be solved similar to those of logarithmic amplitude spectra in surface consistent deconvolution. Individual trace compensation operators may be recombined from the surface consistent ratios of traveltime and Q, ensuring that inverse-Q filters are applied to the data, which preserve the surface consistent structure of the data.

Figure 4:
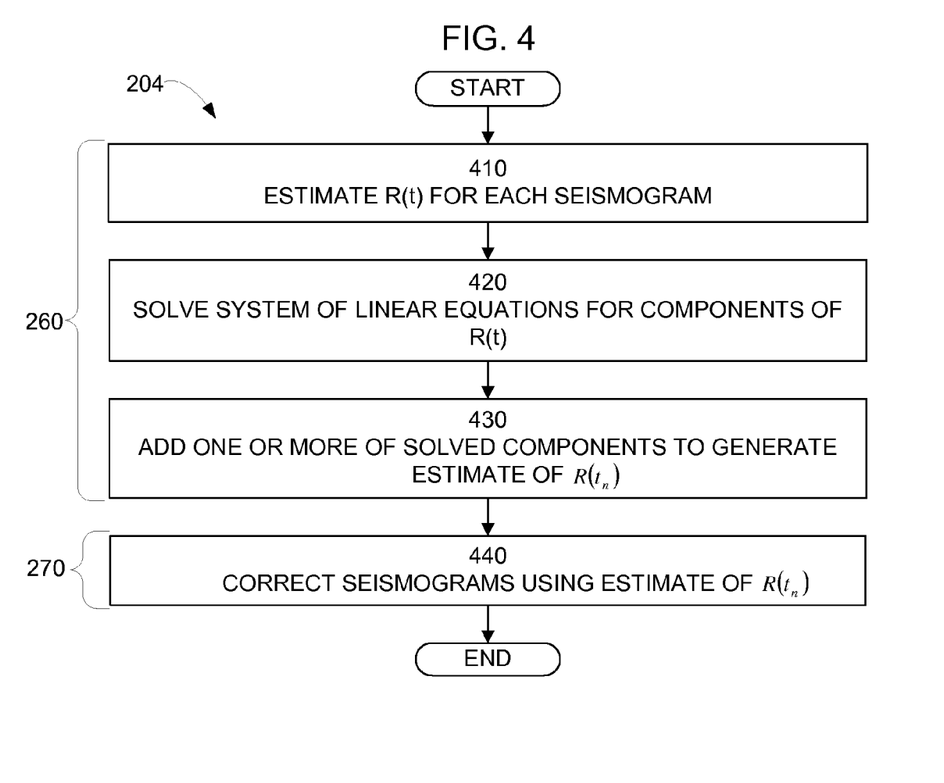
FIG. 4 illustrates a flow diagram of a method for correcting spectral distortions due to the seismic waves traveling through deeper strata in accordance with implementations of various techniques described herein.

FIG. 4 illustrates a flow diagram of a method 204 for correcting spectral distortions due to the seismic waves traveling through deeper strata in accordance with implementations of various techniques described herein. As shown in FIG. 4, steps 410-430 correspond to steps 260 and describe the surface consistent absorption analysis performed on corrected data C. Step 440 corresponds to step 270, surface consistent absorption compensation filtering.

In one implementation of the method to correct for spectral distortions due to the seismic waves traveling through deeper strata 204, a ratio of traveltime (t) to absorption parameter (Q) may be computed for each seismogram. The ratio may be referred to as R. Further, the ratio may be computed for a predetermined set of traveltimes. As a result, a system of linear equations may be generated, where each ratio is represented by a linear equation having a number of unknown components. The system of linear equations may then be solved for the unknown components. The solved components may then be recombined or added to generate an estimate of R. In one implementation, only a portion of the solved components may be added. The seismograms may then be corrected using the estimate of R. As such, the seismograms may be corrected for absorption effects in a surface consistent manner.

At step 410, a ratio of traveltime (t) to absorption parameter (Q(t)) may be estimated for each seismogram. The ratio of traveltime (t) to absorption parameter (Q(t)) may be referred to as R(t). The ratio R(t) may be estimated for predetermined instances of traveltimes, e.g., 500 ms, 1000 ms, 1500 ms, etc. As such, the estimation of ratio R(t) may be expressed as $$R(t_n) = \frac{t_n}{Q(t_n)},$$

where n represents predetermined instances of traveltimes.

Figure 5:
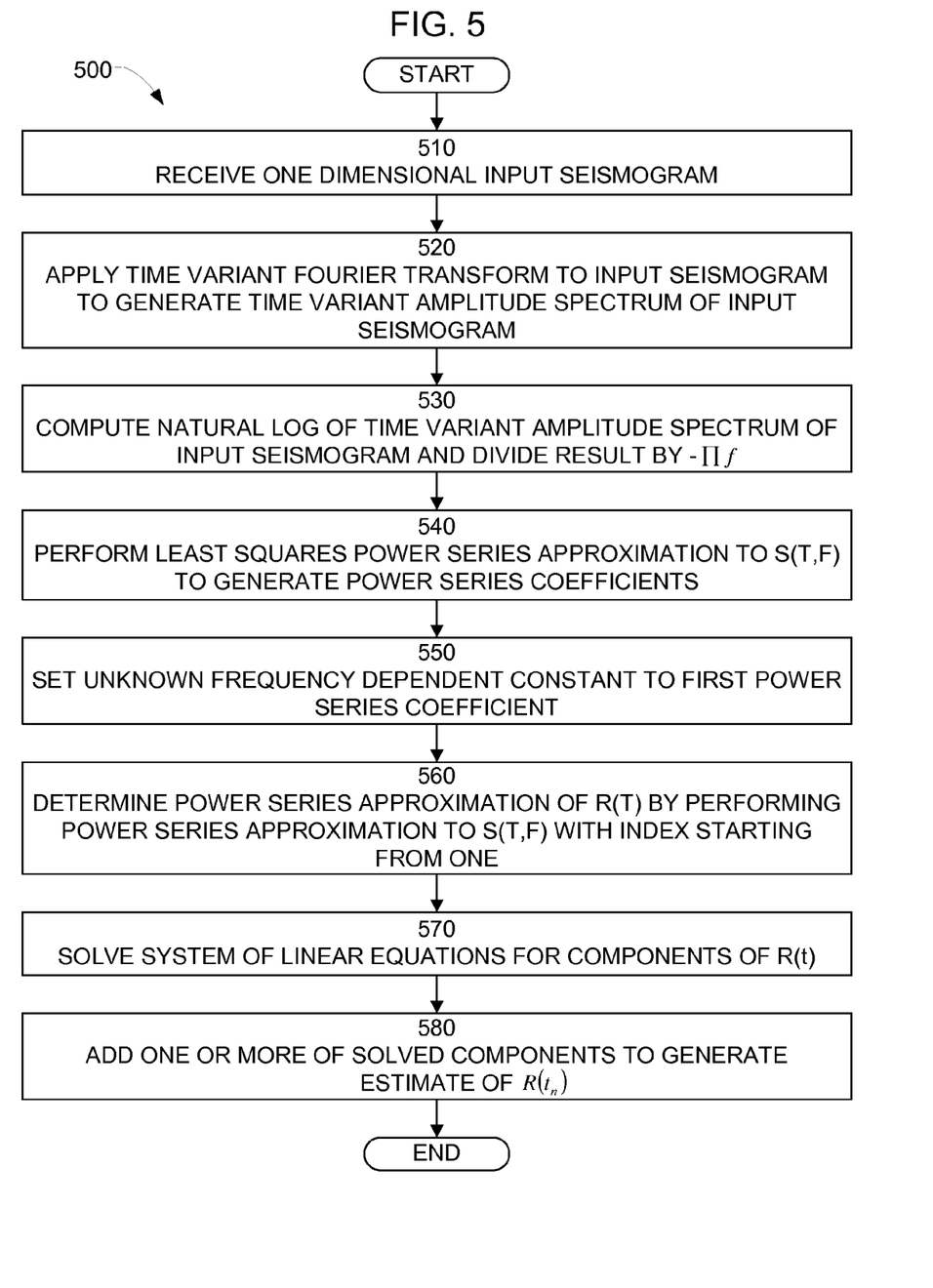
FIG. 5 illustrates a flow diagram of a method for estimating R(t) in connection with implementations of various techniques described herein.

FIG. 5 illustrates a flow diagram of a method 500 for estimating R(t) in connection with implementations of various techniques described herein. At step 510, a one dimensional input seismogram, i.e., based on traveltime t, may be received. At step 520, a time variant Fourier transform may be applied to the input seismogram to generate a time variant amplitude spectrum of the input seismogram, which may be represented as X(t, f). The time variant amplitude spectrum of the input seismogram X(t, f) may be expressed as:

$$X(t,f) = A(t,f)W(f)I(f) \qquad \text{Equation (1),}$$

where A(t, f) represents a time variant exponential absorption term, W(f) represents a time invariant source wavelet, and I(f) represents a time-invariant reflectivity. The time variant exponential absorption term A(t, f) may be expressed as:

$$A(t, f) = \exp(-\pi f R(t)), \qquad \text{Equation (2)}$$

$$\text{where } R(t) = \frac{t}{Q(t)}.$$

At step 530, the natural logarithm of the time variant amplitude spectrum of the input seismogram X(t, f) may be calculated and the result may be divided by $-\pi f$. Step 330 may be expressed as:

$$S(t, f) = \frac{\ln(X(t, f))}{-\pi f} = R(t) + c(f). \qquad \text{Equation (3)}$$

At step 540, a least squares power series approximation to S(t, f) may be performed to generate a plurality of power series coefficients $s_i$, i.e., $s_0, s_1, s_2, \ldots s_n$. The least squares estimate to the power series coefficients may be computed by solving the following minimization problem:

$$\left\| S(t, f) - \sum_{i=0}^{n} s_i t^i \right\|^2 \to \min.$$

In one implementation, the least squares powers series is of a low order, i.e., n is a small number, e.g., from about 2 to about 8.

S(t, f) may also be expressed as: S(t,f)=R(t)+c(f) where c(f) represents an unknown frequency dependent constant. At step 550, the unknown frequency dependent constant c(f) may be set to be equal to the first power series coefficient $s_0$. At step 560, a power series approximation to R(t) may be determined by performing a power series approximation to S(t, f) with the index starting from 1, as opposed to 0, i.e., without using the first power series coefficient $s_0$. The power series approximation to R(t) may be expressed as:

$$\hat{R}(t) = \sum_{i=1}^{n} s_i t^i.$$

In this manner, the ratio R(t) may be approximated by the power series approximation.

As such, at the end of step 410, a linear equation $\hat{R}(t) = R_a(t) + R_s(t) + R_r(t) + R_o(t) + R_i(t)$ may be generated for each seismogram for predetermined instances of traveltimes. At step 420, a system of linear equations for all the seismograms may be solved for $R_a(t)$, $R_s(t)$, $R_r(t)$, $R_o(t)$ and $R_i(t)$. As mentioned above, $R_a$ represents a multiplicative average absorption effect, $R_s$ represents residual absorption effects attributed to the sources, $R_r$ represents residual absorption effects attributed to the receivers, $R_o$ represents residual absorption effects attributed to offsets between receivers and the sources and $R_i$ represents residual absorption effects attributed to common mid point of the seismograms. Although the system of linear equations is discussed with reference to solving five components, it should be understood that is some implementations the system of linear equations may be solved for more or less components.

At step 430, one or more of the solved components may be summed or recombined to generate an estimate of $R(t_n)$. Again, all or only a portion of the solved components may be summed or recombined.

At step 440, the seismograms may be corrected using the estimate of $R(t_n)$ computed in step 430. In one implementation, each seismogram may be corrected using its own estimate of $R(t_n)$. In another implementation, each seismogram may be corrected using a number of estimates of $R(t_n)$ based on the number of instances of traveltimes.

Figure 6:
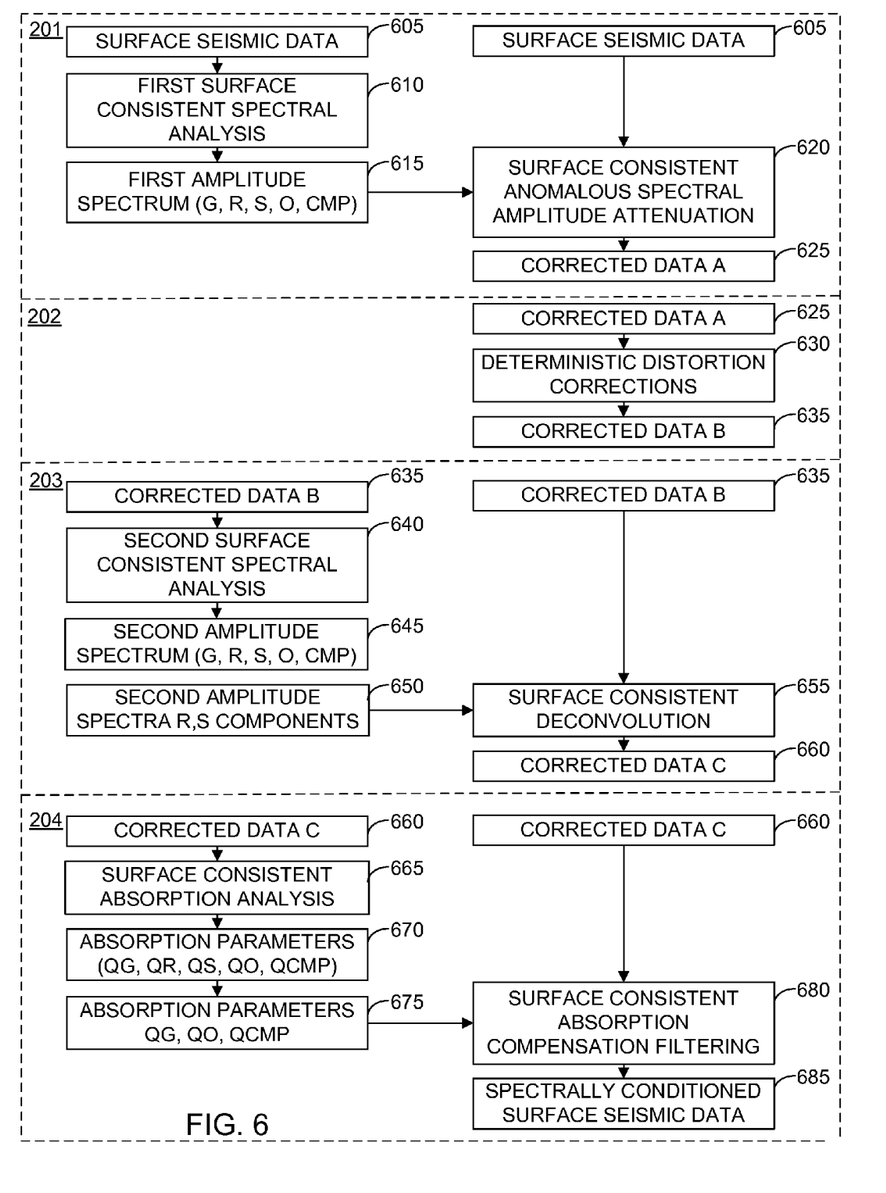
FIG. 6 illustrates the flow of seismic data through the method for optimizing spectral conditioning of surface seismic data in accordance with implementations of various techniques described herein.

FIG. 6 illustrates the flow of seismic data through the method 200 for optimizing spectral conditioning of surface seismic data in accordance with implementations of various techniques described herein. FIG. 6 illustrates the methods for correcting each type of distortion in four dashed boxes.

The analysis phases may be illustrated on the left and the correction phases may be illustrated on the right.

The method to correct for distortions due to anomalous spectral amplitudes 201 is illustrated in the first dashed box. In the analysis phase, the surface seismic data 605 may be the input for a first surface consistent spectral analysis 610 to generate a first amplitude spectrum 615 with global G, receiver R, source S, offset O and common mid-point CMP components. In the correction phase, the original surface seismic data 605 may be corrected through surface consistent spectral amplitude attenuation 620 using the first set of amplitude spectra 615 from the analysis phase to generate corrected data A 625. Corrected data A may be surface seismic data with spectral anomalies removed.

The method to correct for deterministic distortions 202 is illustrated in the second dashed box. The corrected data A 625 may be corrected for deterministic distortions 630 to generate corrected data B 635. Corrected data B may be surface seismic data with spectral anomalies and known distortions removed.

The method to correct for spectral distortions due to the seismic waves traveling through the near-surface 203 is illustrated in the third dashed box. In the analysis phase, the corrected data B 635 may be the input for a second surface consistent spectral analysis 640 to generate a second amplitude spectrum 645 with global G, receiver R, source S, offset O and common mid-point CMP components. In the correction phase, the corrected data B 635 may be corrected through surface consistent deconvolution 655 using only the receiver and source components 650 of the second set of amplitude spectra from the analysis phase to generate corrected data C 660. Corrected data C may be surface seismic data with spectral anomalies, known distortions and near-surface distortions removed.

The method to correct for spectral distortions due to the seismic waves traveling through deeper strata 204 is illustrated in the fourth dashed box. In the analysis phase, the corrected data C 660 may be the input for a surface consistent absorption analysis 665 and generate absorption parameters 670 with global QG, receiver QR, source QS, offset QO and common mid-point QCMP parameters. In the correction phase, the corrected data C 660 may be corrected through surface consistent absorption compensation filtering 680 using only the global, offset and common mid-point absorption parameters 675 from the analysis phase to generate spectrally conditioned surface seismic data 685. The spectrally conditioned surface seismic data may be surface seismic data with spectral anomalies, known distortions, near-surface distortions and deeper strata distortions removed.

Figure 7:
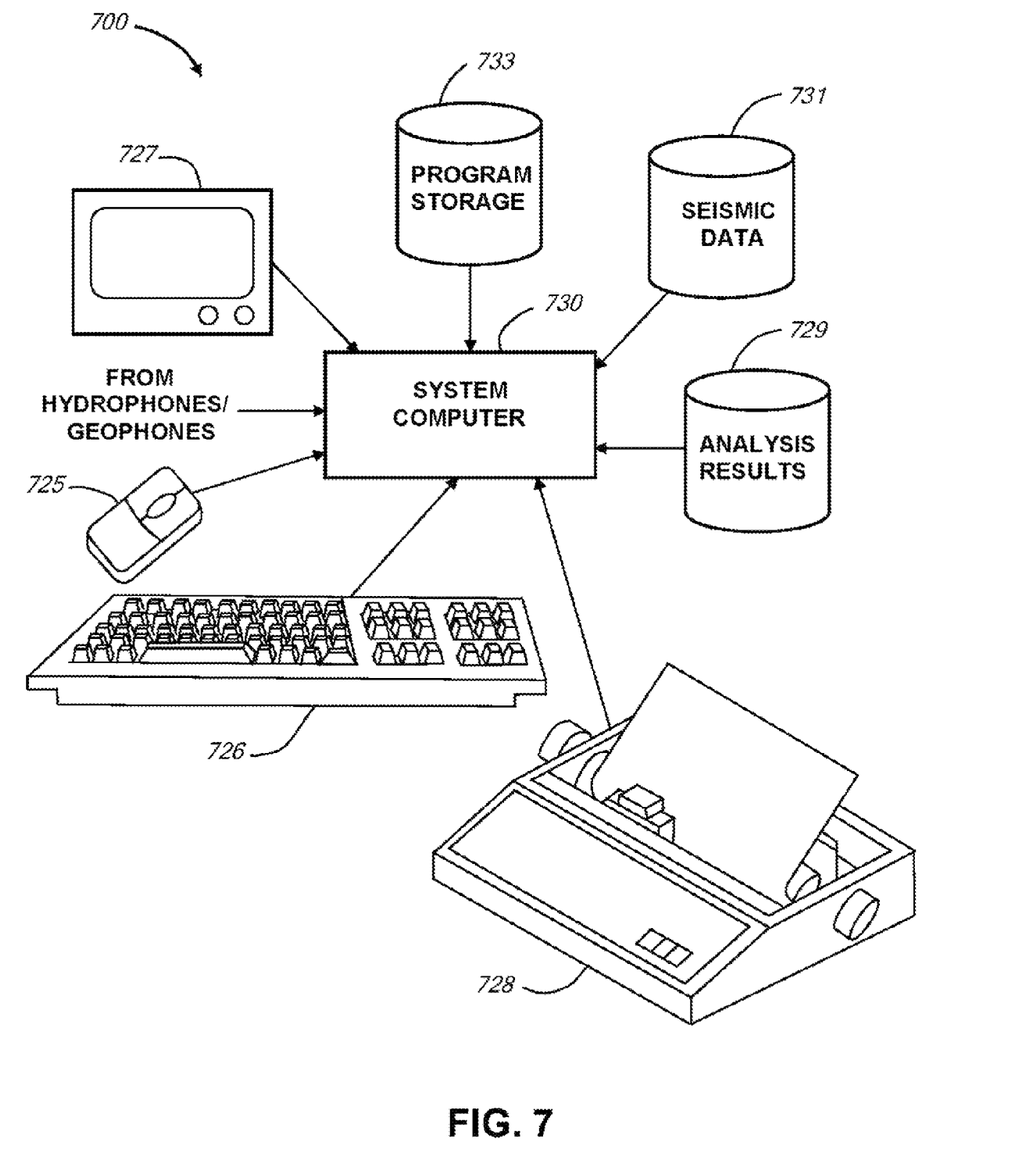
FIG. 7 illustrates a computing system, into which implementations of various techniques described herein may be implemented.

FIG. 7 illustrates a computing system 700, into which implementations of various techniques described herein may be implemented. The computing system 700 may include one or more system computers 730, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 730 may be in communication with disk storage devices 729, 731, and 733, which may be external hard disk storage devices. It is contemplated that disk storage devices 729, 731, and 733 are conventional hard disk drives, and as such, will be implemented by way of a local area network or by remote access. Of course, while disk storage devices 729, 731, and 733 are illustrated as separate devices, a single disk storage device may be used to store any and all of the program instructions, measurement data, and results as desired.

In one implementation, seismic data from the receivers may be stored in disk storage device 731. The system computer 730 may retrieve the appropriate data from the disk storage device 731 to process seismic data according to program instructions that correspond to implementations of various techniques described herein. The program instructions may be written in a computer programming language, such as C++, Java and the like. The program instructions may be stored in a computer-readable medium, such as program disk storage device 733. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 730. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 730 may present output primarily onto graphics display 727, or alternatively via printer 728. The system computer 730 may store the results of the methods described above on disk storage 729, for later use and further analysis. The keyboard 726 and the pointing device (e.g., a mouse, trackball, or the like) 725 may be provided with the system computer 730 to enable interactive operation.

The system computer 730 may be located at a data center remote from the survey region. The system computer 730 may be in communication with the receivers (either directly or via a recording unit, not shown), to receive signals indicative of the reflected seismic energy. These signals, after conventional formatting and other initial processing, may be stored by the system computer 730 as digital data in the disk storage 731 for subsequent retrieval and processing in the manner described above. While FIG. 7 illustrates the disk storage 731 as directly connected to the system computer 730, it is also contemplated that the disk storage device 731 may be accessible through a local area network or by remote access. Furthermore, while disk storage devices 729, 731 are illustrated as separate devices for storing input seismic data and analysis results, the disk storage devices 729, 731 may be implemented within a single disk drive (either together with or separately from program disk storage device 733), or in any other conventional manner as will be fully understood by one of skill in the art having reference to this specification.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for spectrally conditioning surface seismic data, comprising:
    correcting surface seismic data for distortions due to anomalous spectral amplitudes, thereby generating a first set of corrected data;
    correcting the first set of corrected data for deterministic distortions, thereby generating a second set of corrected data;
    correcting the second set of corrected data for spectral distortions due to the seismic waves traveling through the near-surface, thereby generating a third set of corrected data: and
    correcting, using a microprocessor, the third set of corrected data for spectral distortions due to the seismic waves traveling through deeper strata by:
        performing a surface consistent absorption analysis using the third set of corrected data to generate a set of absorption parameters having global, offset and common mid-point parameters; and
        performing a surface consistent absorption compensation filtering using the third set of corrected data and the global, offset arid common mid-point parameters.

2. The method of claim 1, wherein correcting for distortions due to anomalous spectral amplitudes comprises:
    performing a first surface consistent spectral analysis using the surface seismic data to generate a first set of amplitude spectra;
    computing one or more actual amplitude spectra of each seismogram in the surface seismic data;
    computing one or more estimated amplitude spectra of each seismogram using the first set of amplitude spectra;
    comparing the actual amplitude spectra with the estimated amplitude spectra of each seismogram to determine portions of each seismogram dominated by anomalies; and
    reconstructing the portions of each seismogram dominated by the anomalies.

3. The method of claim 2, wherein correcting for distortions due to the seismic waves traveling through the near-surface comprises:
    performing a second surface consistent spectral analysis using the second set of corrected data to generate a second set of amplitude spectra having source and receiver components; and
    performing a surface consistent deconvolution using the second set of corrected data and the source and receiver components.

4. The method of claim 1, wherein correcting for distortions due to the seismic waves traveling through the deeper strata comprises:
    computing a ratio of traveltime to absorption parameter for each seismogram to generate a system of linear equations, the ratio being expressed as a linear equation having a plurality of components;
    solving the system of linear equations for the plurality of components;
    adding one or more of the solved components to generate an estimate of the ratio of traveltime to absorption parameter; and
    correcting the seismograms using the estimate of the ratio of traveltime to absorption parameter.

5. A method for spectrally conditioning surface seismic data, comprising: performing a first surface consistent spectral analysis using surface seismic data to generate a first set of amplitude spectra having at least one source component and at least one receiver component;
    performing a surface consistent deconvolution using the surface seismic data, the at least one source component and the at least one receiver component to generate a first set of corrected data;
    performing a surface consistent absorption analysis using the first set of corrected data to generate a set of surface consistent absorption parameters having a global Parameter, an offset parameter and a common mid-point parameter; and
    performing, using a microprocessor, surface consistent absorption compensation filtering using the first set of corrected data and the global, offset and common mid-point parameters.

6. The method of claim 5, further comprising:
    performing a second surface consistent spectral analysis using the surface seismic data to generate a second set of amplitude spectra; and
    performing a surface consistent anomalous spectral amplitude attenuation using the surface seismic data and the second set of amplitude spectra.

7. The method of claim 6, wherein performing the surface consistent anomalous spectral amplitude attenuation comprises:
    computing one or more actual amplitude spectra of each seismogram in the surface seismic data;
    computing one or more estimated amplitude spectra of each seismogram using the second set of amplitude spectra;
    comparing the actual amplitude spectra with the estimated amplitude spectra of each seismogram to determine portions of each seismogram dominated by anomalies; and
    reconstructing the portions of each seismogram dominated by the anomalies.

8. The method of claim 5, further comprising: correcting the surface seismic data for deterministic distortions.

9. The method of claim 5, further comprising:
    performing a second surface consistent spectral analysis using surface seismic data to generate a second set of amplitude spectra;
    computing one or more actual amplitude spectra of each seismogram in the surface seismic data;
    computing one or more estimated amplitude spectra of each seismogram using the second set of amplitude spectra;
    comparing the actual amplitude spectra with the estimated amplitude spectra of each seismogram to determine portions of each seismogram dominated by anomalies;
    reconstructing the portions of each seismogram dominated by the anomalies, thereby generating a second set of corrected data; and
    correcting the second set of corrected data for deterministic distortions.

10. A method for spectrally conditioning surface seismic data, comprising:

performing a first surface consistent spectral analysis using surface seismic data to generate a first set of amplitude spectra;

computing one or more actual amplitude spectra of each seismogram in the surface seismic data;

computing one or more estimated amplitude spectra of each seismogram using the first set of amplitude spectra;

comparing the actual amplitude spectra with the estimated amplitude spectra of each seismogram to determine portions of each seismogram dominated by anomalies; and reconstructing, using a microprocessor, the portions of each seismogram dominated by the anomalies, thereby generating a first set of corrected data.

11. The method of claim 10, further comprising: correcting the first set of corrected data for deterministic distortions, thereby generating a second set of corrected data.

12. The method of claim 11, further comprising:

performing a second surface consistent spectral analysis using the second set of corrected data to generate a second set of amplitude spectra having source and receiver components; and performing a surface consistent deconvolution using the second set of corrected data and the source and receiver components.

13. The method of claim 11, further comprising:

performing a surface consistent absorption analysis using the second set of corrected data to generate a set of absorption parameters having global, offset and common mid-point parameters; and performing surface consistent absorption compensation filtering using the second set of corrected data and the global, offset and common mid-point parameters.

14. The method of claim 10, further comprising: correcting the surface seismic data for distortions due to the seismic waves traveling through the near-surface.

15. The method of claim 14, wherein correcting for distortions due to the seismic waves traveling through the near-surface comprises:

performing a second surface consistent spectral analysis using the first set of corrected data to generate a second set of amplitude spectra having source and receiver components; and performing surface consistent deconvolution using the first set of corrected data and the source and receiver components.

16. The method of claim 10, further comprising: correcting the surface seismic data for distortions due to the seismic waves traveling through the deeper strata.

17. The method of claim 16, wherein correcting for distortions due to the seismic waves traveling through the deeper strata comprises:

performing a surface consistent absorption analysis using the first set of corrected data to generate a set of absorption parameters having global, offset and common mid-point parameters; and performing surface consistent absorption compensation filtering using the first set of corrected data and the global, offset and common mid-point parameters.

18. A method for correcting distortions due to anomalous spectral amplitudes from surface seismic data, comprising:

performing a surface consistent spectral analysis using surface seismic data to generate a set of amplitude spectra;

computing one or more actual amplitude spectra of each seismogram in the surface seismic data;

computing one or more estimated amplitude spectra of each seismogram using the set of amplitude spectra;

comparing the actual amplitude spectra with the estimated amplitude spectra of each seismogram to determine portions of each seismogram dominated by anomalies;

removing the portions of each seismogram dominated by the anomalies, and reconstructing, using a microprocessor, the removed portions of each seismogram.

19. The method of claim 18, wherein comparing the actual amplitude spectra and the estimated amplitude spectra of each seismogram to determine portions of each seismogram dominated by anomalies comprises:

computing the difference between the actual amplitude spectra and the estimated amplitude spectra of each seismogram; and determining portions of each seismogram dominated by the anomalies if the computed difference is greater than a selected threshold.

20. The method of claim 18, wherein reconstructing the removed portions of each seismogram comprises: performing Fourier reconstruction using neighboring seismograms not determined to be dominated by anomalies.

21. The method of claim 18, wherein reconstructing the removed portions of each seismogram comprises:

performing Fourier reconstruction using neighboring seismograms not determined to be dominated by anomalies; and performing single channel noise attenuation filtering when Fourier reconstruction cannot be performed.

* * * * *